(12) United States Patent
Bui et al.

(10) Patent No.: US 7,920,356 B2
(45) Date of Patent: *Apr. 5, 2011

(54) METHOD AND SYSTEM FOR PROVIDING A LONGITUDINALLY SHIFTED SERVO PATTERN FOR INCREASED SAMPLING RATE

(75) Inventors: Nhan Xuan Bui, Tucson, AZ (US);
Reed Alan Hancock, Tucson, AZ (US);
Eiji Ogura, Yokohama (JP); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 469 days.

This patent is subject to a terminal disclaimer.

(21) Appl. No.: 12/024,125

(22) Filed: Feb. 1, 2008

(65) Prior Publication Data
US 2008/0117542 A1  May 22, 2008

(51) Int. Cl.
*G11B 5/584* (2006.01)
(52) U.S. Cl. .................................................. 360/77.12
(58) Field of Classification Search ............ 360/77.12, 360/48, 74.4, 78.02, 29, 69
See application file for complete search history.

(56) References Cited

U.S. PATENT DOCUMENTS

| | | | |
|---|---|---|---|
| 4,530,012 A | 7/1985 | Kinjo | 358/327 |
| 4,783,705 A | 11/1988 | Moon et al. | 360/77 |
| 4,912,576 A | 3/1990 | Janz | 360/77.07 |
| 5,115,360 A | 5/1992 | Sidman | 360/77.08 |
| 5,689,384 A | 11/1997 | Albrecht et al. | 360/77.12 |
| 5,930,065 A | 7/1999 | Albrecht et al. | 360/72.2 |
| 6,031,673 A | 2/2000 | Fasen et al. | 360/53 |
| 6,111,719 A | 8/2000 | Fasen | 360/73.04 |
| 6,169,640 B1 | 1/2001 | Fasen | 360/48 |
| 6,278,571 B1 | 8/2001 | Bui et al. | 360/77.12 |
| 6,310,747 B1 | 10/2001 | Emo et al. | 360/97.02 |
| 6,462,899 B1 | 10/2002 | Chliwnyj et al. | 360/77.12 |
| 6,532,128 B1 * | 3/2003 | Bui et al. | 360/74.1 |
| 6,580,581 B1 * | 6/2003 | Bui et al. | 360/78.02 |

(Continued)

OTHER PUBLICATIONS

Allen Keith Bates, et al., 'Multiple Servo Sensor Configuration for Magnetic Tape Timing Based Servo'; pp. 1-29 (includes 7 pages of figures), U.S. Appl. No. 11/535,328, filed Sep. 26, 2006.

(Continued)

*Primary Examiner* — Fred Tzeng
(74) *Attorney, Agent, or Firm* — Zilka-Kotab, PC (57) ABSTRACT

A method and a system are provided for writing a plurality of servo bands on magnetic tape. The magnetic tape is moved longitudinally relative to at least one servo write head. The servo write head is positioned to write a plurality of parallel longitudinal servo bands. The plurality of servo bands comprise odd servo bands and even servo bands, and each of the odd servo bands lie between the each of the even servo bands. The at least one servo write head is operated to write the plurality of parallel longitudinal servo bands on the magnetic tape such that each of the plurality of servo bands comprise a plurality of frames, wherein each frame comprises a plurality of bursts of transition stripes, and each burst has a first transition stripe. The first transition stripe of each burst of each the odd servo band is longitudinally shifted from the first transition stripe of each burst of each even servo band by a substantially equal distance, D, such that servo information of the odd servo bands is interleaved with the servo information from the even servo bands.

23 Claims, 7 Drawing Sheets

U.S. PATENT DOCUMENTS

| | | | |
|---|---|---|---|
| 6,606,216 B1 | 8/2003 | Liikanen et al. | 360/77.08 |
| 6,754,033 B1 | 6/2004 | Argumedo et al. | 360/77.12 |
| 6,791,781 B2 | 9/2004 | Bui et al. | 360/72.2 |
| 6,937,413 B2 | 8/2005 | Bui et al. | 360/48 |
| 6,963,467 B2 | 11/2005 | Bui et al. | 360/77.12 |
| 7,002,763 B2 | 2/2006 | Bui et al. | 360/48 |
| 7,095,583 B2 | 8/2006 | Johnson et al. | 360/77.12 |
| 7,102,847 B2 | 9/2006 | Bui et al. | 360/77.12 |
| 7,167,329 B2 | 1/2007 | Baker | 360/55 |
| 7,170,702 B2 | 1/2007 | Ohtsu | 360/48 |
| 7,259,930 B2 | 8/2007 | Ohtsu | 360/73.04 |
| 7,403,350 B2 * | 7/2008 | Bates et al. | 360/29 |
| 7,421,640 B2 | 9/2008 | Cideciyan et al. | 714/771 |
| 7,529,061 B2 * | 5/2009 | Bui et al. | 360/77.12 |
| 2005/0286158 A1 | 12/2005 | Bui et al. | 360/77.12 |
| 2005/0286159 A1 | 12/2005 | Bui et al. | 360/77.12 |
| 2005/0286160 A1 | 12/2005 | Bui et al. | 360/77.12 |
| 2008/0117539 A1 * | 5/2008 | Bui et al. | 360/48 |
| 2008/0117542 A1 | 5/2008 | Bui et al. | 360/77.12 |
| 2008/0273264 A1 | 11/2008 | Biskeborn et al. | 360/121 |

OTHER PUBLICATIONS

Nhan X. Bui, et al., 'Tape Cartridge Having Tape Media With Longitudinally Shifted Servo Pattern for Increased Sampling Rate'; pp. 1-31 (includes 6 pages of figures), U.S. Appl. No. 12/024,127, filed Feb. 1, 2008.

Nhan X. Bui, et al., 'Tape Drive for Maintaining Lateral Position Utilizing Longitudinally Shifted Servo Pattern with Increased Sampling Rate'; pp. 1-31 (includes 6 pages of figures); U.S. Appl. No. 12/024,129, filed Feb. 1, 2008.

* cited by examiner

METHOD AND SYSTEM FOR PROVIDING A LONGITUDINALLY SHIFTED SERVO PATTERN FOR INCREASED SAMPLING RATE

DOCUMENT INCORPORATED BY REFERENCE

Commonly assigned U.S. Pat. No. 5,689,384 is incorporated for its showing of a timing based servo system.

FIELD OF THE INVENTION

This invention relates to a method and a system for providing servo pattern for servoing for magnetic tape, and more particularly, a servo pattern for magnetic tape having timing based servo band(s) extending in the longitudinal direction of the magnetic tape.

BACKGROUND OF THE INVENTION

Magnetic tape provides a means for physically storing data which may be archived or which may be stored in storage shelves of automated data storage libraries and accessed when required. The reading and/or writing of data in bands on magnetic recording tape requires precise positioning of a magnetic head. The magnetic head must be moved to, and maintained centered over, specific longitudinal data bands, as the magnetic tape is moved longitudinally past the magnetic head. The magnetic head is translated between bands in a lateral direction with respect to the longitudinal data bands.

A servo system is employed to move the magnetic head to and position the magnetic head in the center of the desired data band or bands, and to track follow the center of the desired data band or bands. The data bands are becoming increasingly smaller and closer together in order to increase the data band density and thereby increase data capacity of a given tape. Hence, it has become desirable to place the longitudinal defined servo bands at various locations across the full width of the tape, separated by groups of data bands. This allows the servo bands to be close to the data bands and limits offsets due to tape stretch, etc. This also allows a greater number of bands to be employed due to the greater precision of the relationship between the servo bands and the data bands.

SUMMARY OF THE INVENTION

A method and a system are provided for writing a plurality of servo bands on magnetic tape. The magnetic tape is moved longitudinally relative to at least one servo write head. The at least one servo write head is positioned to write a plurality of parallel longitudinal servo bands. The plurality of servo bands comprise odd servo bands and even servo bands, and each of the odd servo bands lie between the each of the even servo bands. The at least one servo write head is operated to write the plurality of parallel longitudinal servo bands on the magnetic tape such that each of the plurality of servo bands comprise a plurality of frames, wherein each frame comprises a plurality of bursts of transition stripes, and each burst has a first transition stripe. The first transition stripe of each burst of each the odd servo band is longitudinally shifted from the first transition stripe of each burst of each even servo band by a substantially equal distance, D, such that servo information of the odd servo bands is interleaved with the servo information from the even servo bands.

In one embodiment the at least one servo write head is operated to write the plurality of parallel longitudinal servo bands on the magnetic tape such that each frame of the plurality of frames further comprises a first burst of transition stripes in a first azimuthal orientation and a second burst of transition stripes in a second azimuthal orientation different than the first azimuthal orientation, followed by a third burst of transition stripes in the first azimuthal orientation and a fourth burst of transition stripes in the second azimuthal orientation such that a distance between the first transition stripe of the first burst and the first transition stripe of the third burst is a distance B.

In one embodiment the magnetic tape is configured for a tape drive having a plurality of servo read elements, and the first transition stripe of each burst of each the odd servo band is longitudinally shifted from the first transition stripe of each burst of each the even servo band by a substantially equal distance, D, wherein $$0.9\frac{B}{X} \leq D \leq 1.1\frac{B}{X}$$

and wherein X is a number servo read elements of the tape drive.

Accordingly, in one embodiment the magnetic tape is configured for a tape drive having two servo read elements such that $0.45B \leq D \leq 0.55B$. In another embodiment, the magnetic tape is configured for a tape drive having three servo read elements such that $0.30B \leq D \leq 0.37B$.

The system for writing a plurality of servo bands on a magnetic tape may include a drive for moving the magnetic tape longitudinally relative to at least one servo write head. In a one embodiment the system includes at least three spaced apart servo write heads. The at least three spaced apart servo write heads comprise odd servo write heads and even servo write heads, each of the odd servo write heads lie between the each of the even servo write heads. The system further includes a source of timed pulses coupled to the even servo write heads configured to write even servo bands. Each even servo band includes a plurality of frames, and each frame comprises a plurality of bursts of transition stripes, and each burst has a first transition stripe. The system also includes a source of timed pulses coupled to the odd servo write heads configured to write odd servo bands. Each odd servo band comprises a plurality of frames, and each frame comprises a plurality of bursts of transition stripes, and each burst has a first transition stripe. The system is configured to write each the servo bands such that each of the odd servo bands lie between the each of the even servo bands. The source of timed pulses coupled to the odd servo write heads are timed such that the first transition stripe of each burst of each the odd servo band is longitudinally shifted from the first transition stripe of each burst of each the even servo band by a substantially equal distance, D, such that servo information of the odd servo bands is interleaved with the servo information from the even servo bands.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Figure 1:
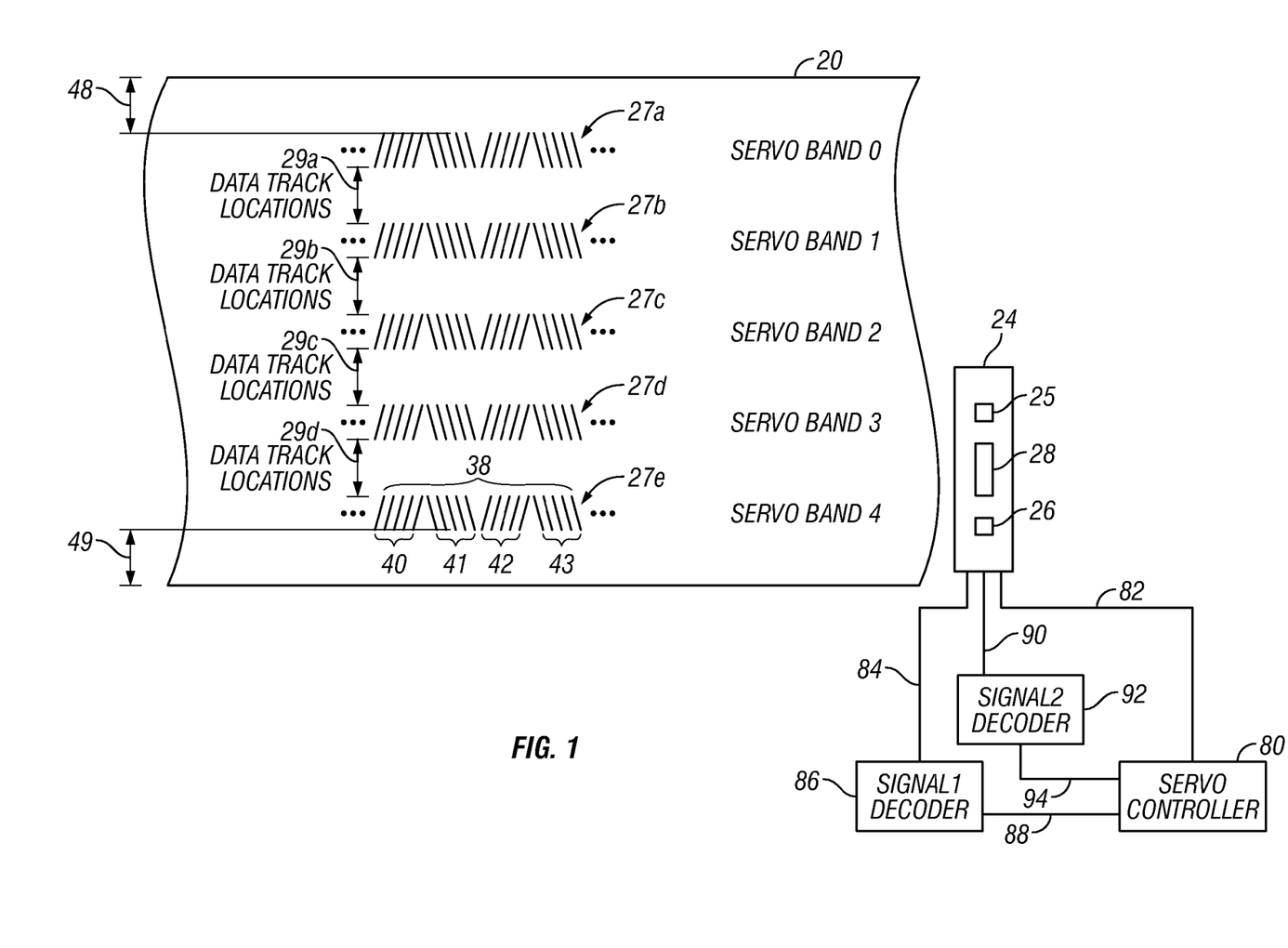
FIG. 1 is a diagrammatic illustration of a magnetic tape having a timing based servo track, and of a magnetic head and servo system of a magnetic tape drive having multiple servo read elements.

Referring to FIG. 1, a timing based servo pattern is described on a magnetic tape, such as magnetic tape 20 wherein prerecorded magnetic parallel longitudinal servo bands 27 (e.g. 27a, 27b, 27c, 27d, and 27e) lie between groups of longitudinal data tracks 29 (e.g. 29a, 29b, 29c, 29d, and 29e). In addition, the magnetic tape 20 is provided with guard bands 48, 49 at the edges of the tape. The longitudinal direction is defined as the direction along the length of the magnetic tape 20. The lateral direction is defined as the direction along the width of the magnetic tape 20 and is perpendicular to the longitudinal direction. The terms "band" and "track" are used interchangeably herein. Similarly, the terms "bands" and "tracks" are used interchangeably herein.

In the specific example of FIG. 1, five longitudinal timing based defined servo bands 27 are prerecorded on a magnetic tape 20 for track following at these positions. The pattern of magnetic transitions recorded in the defined servo bands is a repeated set of frames 38, each of which are of different azimuthal orientations. For example, the pattern may comprise transitions slanted, or having an azimuthal orientation, in a first direction with respect to the longitudinal direction of the linear servo track, alternating with transitions having different slants, for example, in the opposite direction. The groups of transitions having the same azimuthal orientation and separated by gaps or spaces are referred to as "servo bursts" or simply as "bursts" (e.g. bursts 40, 41, 42, and 43). Each servo burst contains a predetermined number of transition stripes per burst, which can be used in error detection and correction.

The head assembly 24 comprises a plurality of read and/or write elements 28 configured to read and/or write data on a magnetic tape with respect to sets of the longitudinal data tracks 29. In the example of FIG. 1, a head assembly 24 comprises at least two narrow servo read elements 25, 26, allowing two servo bands to be sensed simultaneously. The resulting outputs from both servo bands may be averaged or used redundantly to reduce error rates. When the servo read elements 25, 26 are properly positioned at the defined servo bands 27, the read and write elements 28 are properly positioned to transfer data with respect to the data track location of the magnetic tape 20.

Those skilled in the art will recognize that the dark slanted stripes represent magnetized areas of recorded magnetic flux that extend across the width of a servo track 27, and that the edges of the stripes comprise flux transitions that are detected to generate a servo read element signal. The transitions have two magnetic polarities, on each edge of a stripe. When a servo read element crosses a transition of servo track 27, e.g. along servo track centerline 50 of FIG. 2, it produces an analog signal pulse whose polarity is determined by the polarity of the transition. For example, the servo read element may produce positive pulses on the leading edge of each stripe (on encountering the transition of encountering the stripe), and negative pulses on the trailing edge (on encountering the transition on leaving the stripe). To reduce the chance for error, the servo system times only intervals between magnetic flux transitions having the same polarity. As one example, only transition pulses generated by the servo read element in moving across the leading edge of a stripe are used, and transition pulses generated by moving across the trailing edge of a stripe are ignored. Hence, herein, the term "transition" refers to edges of stripes, or equivalent, that result in the generation of signals having the same polarity.

The lateral positioning of the servo read element with respect to the timing based servo track is sensed based on a measure of time between two transitions having different slants, called the "A" distance, as compared to the time between two transitions having parallel slants, called the "B" distance. Referring to FIG. 1 for example, the "A" distance may be measured based on the time between the first transition stripe of burst 40 and the first transition stripe of burst 41. Further, in one example, the "B" distance is measured based on the time between the first transition stripe of burst 40 and the first transition stripe of burst 42. One of ordinary skill in the art would understand that while in the above example the first transition stripe of each burst is used to determine the "A" and "B" distance, any transition stripe of the respective burst may be utilized. For example, the "A" and "B" distances may be determined based on the comparison of the second transition stripe of one burst against the second transition stripe of the other burst. The first transition stripe is defined herein as the first transition stripe the servo read element 25, 26 arrives at in the read direction.

More specifically, lateral position sensing within a defined servo band is achieved by deriving a ratio of these two servo pattern intervals. In particular, the lateral position may be the ratio of (1) the distance between transitions of bursts 40 and 41, called the "A" distance, to (2) the distance between transitions of burst 40 and 42, called the "B" distance. The distances are measured by the timing between the transitions at a constant velocity. Thus, as the tape head servo read elements 25, 26 move toward the lower edge of the tape 20, the ratio of the time between the transitions of burst 40 and 41 to the time between the transitions of bursts 40 and 42 becomes greater, since the distance between the "A" transitions of the burst 40 and 41 is greater, while the distance between the "B" transitions of burst 40 and 42 remains unchanged.

It is important to note that the servo tracks 27 are typically generated by a servo writer having two spaced apart write elements of different slants, forming the "A" distance, which are pulsed simultaneously. Thus, the "A" geometric distance is determined photolithographically, and is therefore, independent of the timing or the velocity of the servo writer drive.

The tape is moved longitudinally across the head assembly 24 so that the servo tracks 27a and 27b are moved across the servo read elements 25 and 26, respectively. When such movement occurs, the servo pattern of magnetic flux transitions is detected by the servo read elements 25 and 26 so that it generates two analog servo read element signals, one for each servo read element 25 and 26. The analog servo read element signals for each servo read element 25 and 26 are provided via a servo signal lines 84 and 90 to signal decoders 86 and 92, respectively. The respective signal decoders then process the servo read element signals and generate a position signal that is transmitted via position signal lines 88 and 94 to servo controller 80. The servo controller 80 generates a servo control signal and provides it on control line(s) 82 to a servo positioning mechanism at head assembly 24. The servo positioning mechanism responds to the control signal from the servo controller 80 by moving the assembly including servo read elements 25 and 26 laterally with respect to the servo track centerline 50 to reach the desired servo track or to maintain the servo read elements 25 and 26 center with respect to the servo track centerline 50.

Servo detection logic of servo system 80 is configured to detect from the signals supplied on line(s) 82, the relative timings of the laterally extending transitions, specifically including the transitions having different slants, sensed by the plurality of laterally spaced servo read elements 25 and 26 as the magnetic tape 20 is moved in the longitudinal direction. The servo detection logic is configured to determine from the relative timings of the sensed transitions the "A" distances and information regarding the relationship between the plurality of servo read elements 25 and 26 and the magnetic tape for at least one known set of laterally extending transitions having differing slants.

Figure 2:
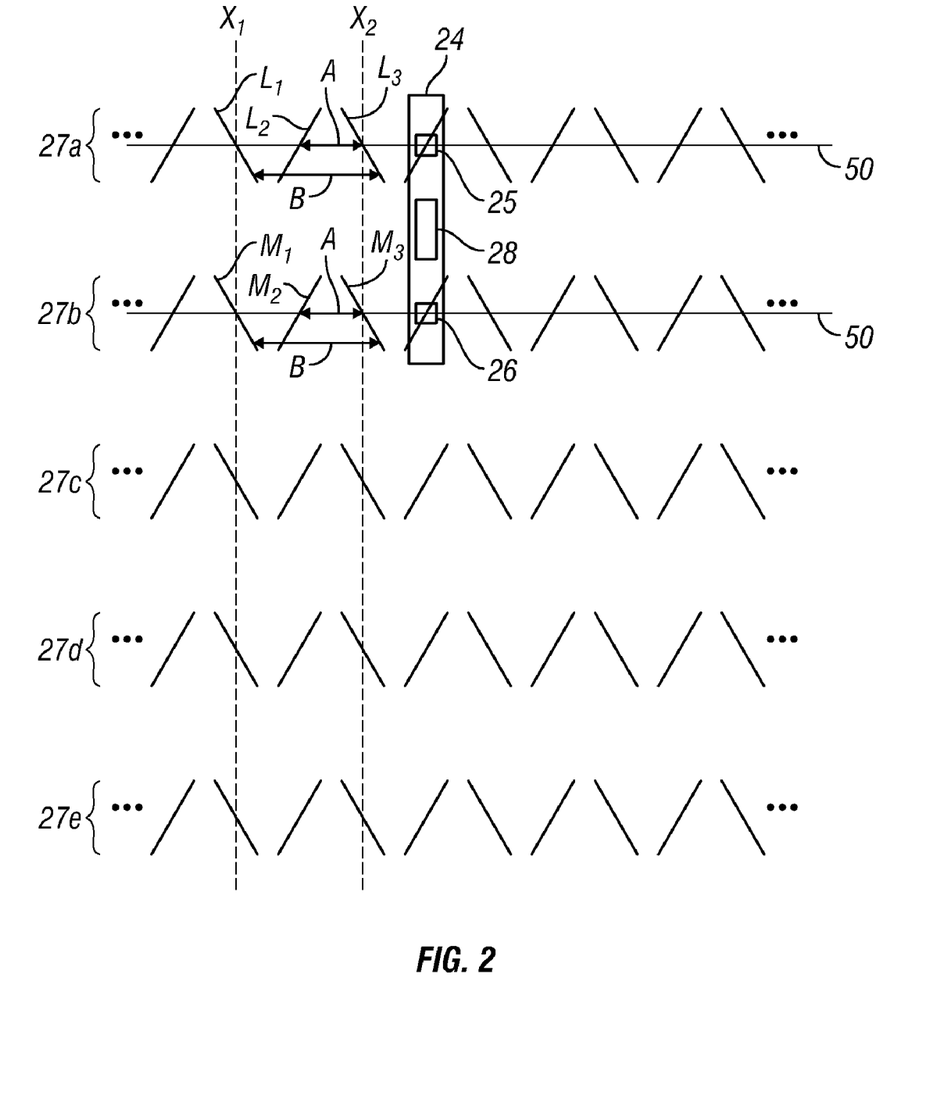
FIG. 2 is a simplified diagrammatic illustration of a magnetic tape having a timing based servo track, and of a magnetic head and servo system of a magnetic tape drive having multiple servo read elements including indication of "A" and "B" signal intervals.

FIG. 2 shows simplified version of a timing based servo pattern on a magnetic tape, such as magnetic tape 20. For purposes of simplifying the illustration each burst is shown in FIG. 2 as a single line. In one embodiment the single line may represent the first transition stripe of each burst.

Similar to that described with respect to FIG. 1, the head assembly 24 comprises at least two narrow servo read elements 25, 26, allowing two servo bands (e.g. 27a and 27b) to be sensed simultaneously. As mentioned above, when a servo read element (e.g. servo read element 25 and/or 26) crosses a transition of servo track 27, e.g. along servo track centerline 50, it produces an analog signal pulse whose polarity is determined by the polarity of the transition.

In the example illustrated in FIG. 2, transition stripe L2, having a first azimuthal orientation, is separated from transition stripe L3, having a second azimuthal orientation, by distance A. In one example, distance A may be 50 μm. Transition stripe L1, having a second azimuthal orientation, is separated from transition stripe L3, also having a second azimuthal orientation, by distance B. In one example, distance B may be 100 μm ("B" distance).

As illustrated in FIG. 2, in the prior art, each burst of transition stripes within one servo band (e.g. 27a) is longitudinally aligned with each burst of transition stripes of all servo bands (e.g. 27b, 27c, 27d, 27e). For example, the burst represented by transition stripe L1 of servo band 27a aligns longitudinally with the burst represented by transition stripe M1 of servo band 27b along x1. Similarly, the bursts represented by transition stripes L2 and L3 align longitudinally with the bursts represented by transition stripes M2 and M3, respectively.

Servo read element 25 (as shown in FIG. 1) measures the "A" distance along servo band 27a by detecting a signal as it crosses a transition stripe of a first azimuthal orientation of servo band 27a (e.g. transition stripe L2) along servo track centerline 50 and then by detecting a signal as it crosses an adjacent transition stripe of a second azimuthal orientation of servo band 27a (e.g. transition stripe L3). Similarly, servo read element 26 measures the "A" distance along servo band 27b by detecting a signal as it crosses a transition stripe of a first azimuthal orientation of servo band 27b (e.g. transition stripe M2) along servo track centerline 50 and then by detecting a signal as it crosses an adjacent transition stripe of a second azimuthal orientation of servo band 27b (e.g. transition stripe M3). Since the transition stripes L3 and M3 align longitudinally along the length of the magnetic tape 20 at x2, the servo read element 25 outputs servo information regarding distance "A" at the same time that servo read element 26 outputs information regarding distance "A". Accordingly, servo information obtained from servo element 26 regarding an odd servo band is provided simultaneously with the servo information obtained from servo element 25 regarding an even servo band.

Furthermore, as illustrated in FIG. 2, servo read element 25 measures the "B" distance along servo band 27a by detecting a signal as it crosses a transition stripe of a second azimuthal orientation of servo band 27a (e.g. transition stripe L1) along servo track centerline 50 and then by detecting a signal as it crosses an adjacent transition stripe of the second azimuthal orientation of servo band 27a (e.g. transition stripe L3). Similarly, servo read element 26 measures the "B" distance along servo band 27b by detecting a signal as it crosses a transition stripe of a second azimuthal orientation of servo band 27b (e.g. transition stripe M1) along servo track centerline 50 and then by detecting a signal as it crosses an adjacent transition stripe of the first azimuthal orientation of servo band 27b (e.g. transition stripe M3). Again, since the transition stripes L3 and M3 align longitudinally along the length of the magnetic tape 20 at x2, the servo read element 25 outputs servo information regarding distance "B" at the same time that servo read element 26 outputs information regarding distance "B". Accordingly, servo information obtained from servo element 26 regarding an odd servo band is provided simultaneously with the servo information obtained from servo element 25 regarding an even servo band.

The sample rate, Fs, of the servo read element signal is determined by the length of the servo pattern and the tape velocity. The sampling rate, Fs may be expressed as:

$$Fs = \frac{velocity}{distance}$$

wherein the velocity is the velocity of the magnetic tape and the distance is the distance between two transition lines of the servo pattern.

For example, assuming a tape velocity of 2 m/sec, a distance "A" of 50 µm, and a distance "B" of 100 µm, the servo read elements 25 and 26 would output servo information at a rate of 20,000 samples every second.

The sample rate required for proper servoing is determined by the rest of the components of the track-following servo loop. In order to support a high bandwidth track following the servo control system requires a high sampling rate servo feedback signal. The high sampling rate provides up-to-date, accurate information of the servo read element position, and therefore, supports a higher servo bandwidth and thus a much better controlled servo system. As the magnetic tape 20 velocity slows to match with the slower data transfer host system (referred to as speed matching) the sampling rate becomes slower and results in too slow of a sampling rate to maintain high bandwidth track following system.

Thus, what is presented is a method and a system that provides a servo pattern with a higher longitudinal density of servo information such that a higher servo sampling rate is realized. The higher sampling rate provides up-to-date accurate information of servo read element position and, therefore, ensures a higher servo bandwidth system with increased control.

In accordance with the present disclosure FIG. 3 describes a timing based servo pattern on a magnetic tape, such as magnetic tape 320 wherein prerecorded magnetic parallel longitudinal servo tracks 327a, 327b, 327c, 327d, and 327e (also referred to herein as 327) lie between groups of longitudinal data tracks 329a, 329b, 329c, 329d, and 329e (herein after referred to as 329). In addition, the prerecorded magnetic parallel servo tracks or bands comprise odd servo bands and even servo bands. The odd servo bands lie between each of the even servo bands. For example, servo bands 327a, 327c and 327e may be defined as even servo bands and servo bands 327b, and 327d may be defined as odd servo bands.

The magnetic tape 320 is also provided with guard bands 348, 349 at the edges of the tape. The longitudinal direction is defined as the direction along the length of the magnetic tape 320. The lateral direction is defined as the direction along the width of the magnetic tape 320 and is perpendicular to the longitudinal direction.

Figure 3:
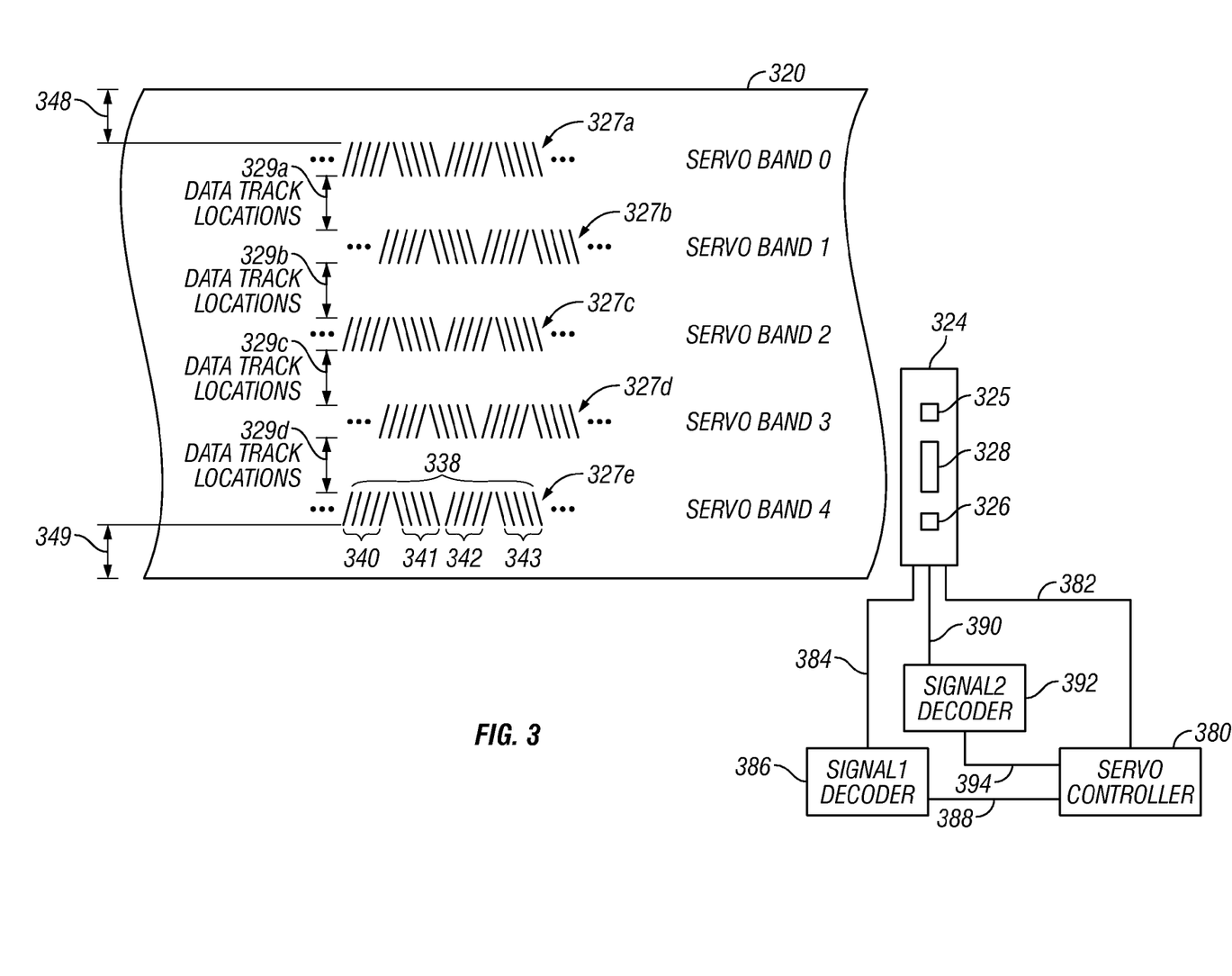
FIG. 3 an embodiment in accordance with the present disclosure of a diagrammatic illustration of a magnetic tape having a timing based servo track, and of a magnetic head and servo system of a magnetic tape drive having multiple servo read elements.

In the example of FIG. 3, five longitudinal timing based defined servo bands 327 are prerecorded on a magnetic tape 320 for track following at these positions. The pattern of magnetic transitions recorded in the defined servo bands is a repeated set of frames 338, each of which are of different azimuthal orientations. For example, the pattern may comprise transitions slanted, or having an azimuthal orientation, in a first direction with respect to the longitudinal direction of the linear servo track, alternating with transitions having different slants, for example, in the opposite direction. The groups of transitions having the same azimuthal orientation and separated by gaps or spaced are referred to as "servo bursts" or simply as "bursts" (e.g. bursts 340, 341, 342, and 343). Each servo burst contains a predetermined number of transition stripes per burst, which can be used in error detection and correction. As shown in FIG. 3, the present embodiment comprises a first burst of a group of five stripes in a first azimuthal orientation and a second burst of a group of five transitions in a second azimuthal orientation different than the first azimuthal orientation, followed by a third burst of a group of four transition stripes in the first azimuthal orientation and a fourth burst a group of four transition stripes in the second azimuthal orientation.

The head assembly 324 comprises a plurality of read and/or write elements 328 configured to read and/or write data on a magnetic tape with respect to sets of the longitudinal data tracks 329. When the servo read elements 325, 326 are properly positioned at the defined servo bands 327, the read and write elements 328 are properly positioned to transfer data with respect to the data track location of the magnetic tape 320.

The lateral positioning of the servo read element with respect to the timing based servo track is sensed based on a measure of time between two transitions having different slants, called the "A" distance, as compared to the time between two transitions having parallel slants, called the "B" distance. Referring to FIG. 3 for example, the "A" distance may be measured based on the time between the first transition stripe of burst 340 and the first transition stripe of burst 341. Further, in one example, the "B" distance is measured based on the time between the first transition stripe of burst 340 and the first transition stripe of burst 342. One of ordinary skill in the art would understand that while in the above example the first transition stripe of each burst is used to determine the "A" and "B" distance, any transition stripe of the respective burst may be utilized. For example, the "A" and "B" distances may be determined based on the comparison of the second transition stripe of one burst against the second transition stripe of the other burst.

More generally, lateral position sensing within a defined servo band is achieved by deriving a ratio of these two servo pattern intervals. Specifically, the lateral position may be the ratio of (1) the distance between transitions of bursts 340 and 341, called the "A" distance, to (2) the distance between transitions of burst 340 and 342, called the "B" distance. The distances are measured by the timing between the transitions at a constant velocity. Thus, as the tape head servo read elements 325, 326 move toward the lower edge of the magnetic tape 320, the ratio of the time between the transitions of burst 340 and 341 to the time between the transitions of bursts 340 and 342 becomes greater, since the distance between the "A" transitions of the burst 340 and 341 is greater, while the distance between the "B" transitions of burst 340 and 342 remains unchanged.

As illustrated in FIG. 3, each burst of transition stripes within the odd servo bands (e.g. 327b and 327d) is longitudinally shifted or is offset from each burst of transition stripes of the even servo bands (e.g. 327a, 327c, and 327e) such that the servo information of said odd servo bands is interleaved with the servo information from the even servo bands.

Figure 4:
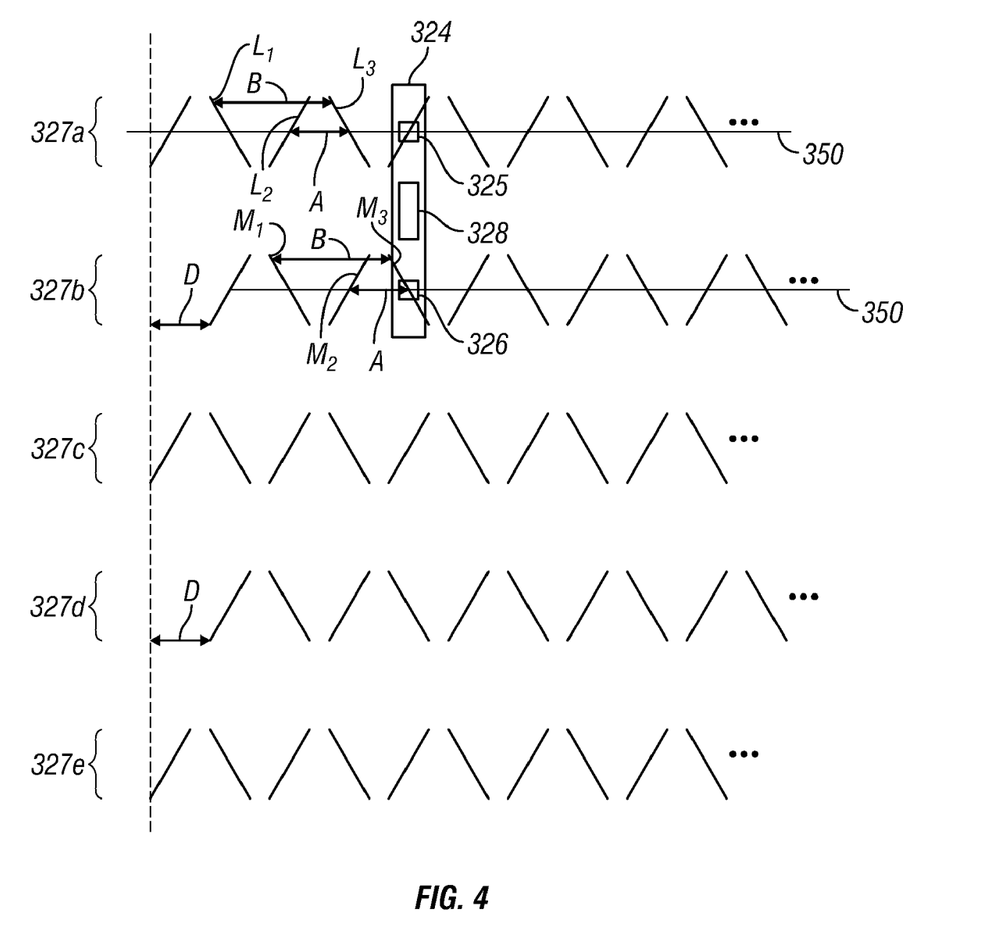
FIG. 4 is an embodiment in accordance with the present disclosure of a simplified diagrammatic illustration of a magnetic tape having a timing based servo track, and of a magnetic head and servo system of a magnetic tape drive having multiple servo read elements including indication of "A" and "B" signal intervals.

FIG. 4 shows simplified version of a timing based servo pattern on a magnetic tape, such as magnetic tape 320. For purposes of simplifying the illustration each burst is shown in FIG. 4 as a single line. In one embodiment the single line may represent the first transition stripe of each burst.

Similar to that described with respect to FIG. 3, the head assembly 324 comprises at least two narrow servo read elements 325, 326, allowing two servo bands (e.g. 327a and 327b) to be sensed simultaneously. As mentioned above, when a servo read element (e.g. servo read element 325 and/or 326) crosses a transition of servo track 327, e.g. along servo track centerline 350, it produces an analog signal pulse whose polarity is determined by the polarity of the transition.

In the example illustrated in FIG. 4 transition stripe L2, having a first azimuthal orientation, is separated from transition stripe L3, having a second azimuthal orientation, by distance "A". In one example, distance "A" may be 50 µm. Transition stripe L1, having a second azimuthal orientation, is separated from transition stripe L3, also having a second azimuthal orientation, by distance "B". In one example, distance "B" may be 100 μm.

As illustrated in FIG. 4, each burst of transition stripes within the odd servo bands (e.g. 327b and 327d) is longitudinally shifted or is offset from each burst of transition stripes of the even servo bands (e.g. 327a, 327c, and 327e). For example, the burst represented by transition stripe M1 of servo band 327b is longitudinally shifted from the burst represented by transition stripe L1 of servo band 327a by a distance "D". Similarly, the bursts represented by transition stripe L2 and L3 are longitudinally shifted from the bursts represented by transition stripe M2 and M3 by a distance "D", respectively. It should be understood by one of ordinary skill in the art, that while not labeled, 327c and 327e contain L1, L2, and L3. As shown in FIG. 4 transitions L1, L2, and L3 of 327c and 327e align with L1, L2, and L3 of 327a, respectively. Similarly, 327d contains M1, M2, and M3. As shown in FIG. 4 transitions M1, M2, and M3 of 327d align with M1, M2 and M3 of 327b, respectively.

Servo read element 325 measures the "A" distance along servo band 327a by detecting a signal as it crosses a transition stripe of a first azimuthal orientation of servo band 327a (e.g. transition stripe L2) along servo track centerline 350 and then by detecting a signal as it crosses an adjacent transition stripe of a second azimuthal orientation of servo band 327a (e.g. transition stripe L3). Similarly, servo read element 326 measures the "A" distance along servo band 327b by detecting a signal as it crosses a transition stripe of a first azimuthal orientation of servo band 327b (e.g. transition stripe M2) along servo track centerline 350 and then by detecting a signal as it crosses an adjacent transition stripe of a second azimuthal orientation of servo band 327b (e.g. transition stripe M3). Since the transition stripes L3 and M3 are longitudinally shifted from each other by a distance "D", the servo read element 325 outputs servo information regarding distance "A" at a different time than when servo read element 326 outputs information regarding distance "A" such that the servo information of the odd servo bands is interleaved with the servo information from the even servo bands. Accordingly, servo information obtained from servo element 326 regarding an odd servo band is not provided simultaneously with the servo information obtained from servo element 325 regarding an even servo band.

Furthermore, as illustrated in FIG. 4, servo read element 325 measures the "B" distance along servo band 327a by detecting a signal as it crosses a transition stripe of a second azimuthal orientation of servo band 327a (e.g. transition stripe L1) along servo track centerline 350 and then by detecting a signal as it crosses an adjacent transition stripe of the second azimuthal orientation of servo band 327a (e.g. transition stripe L3). Similarly, servo read element 326 measures the "B" distance along servo band 327b by detecting a signal as it crosses a transition stripe of a second azimuthal orientation of servo band 327b (e.g. transition stripe M1) along servo track centerline 350 and then by detecting a signal as it crosses an adjacent transition stripe of the second azimuthal orientation of servo band 327b (e.g. transition stripe M3). Again, since the transition stripes L3 and M3 are longitudinally shifted by a distance "D" the servo read element 325 outputs servo information regarding distance "B" at a time different than when the servo read element 326 outputs information regarding distance "B". Accordingly, servo information obtained from servo element 326 regarding an odd servo band is not provided simultaneously with the servo information obtained from servo element 325 regarding an even servo band.

Distance "D" may be expressed by the following equation, wherein X is the number of laterally spaced servo read elements of magnetic tape drive:

$$\left[\frac{1}{X} - .1\left(\frac{1}{X}\right)\right]B \le D \le \left[\frac{1}{X} + .1\left(\frac{1}{X}\right)\right]B \quad \text{(Equation 1)}$$

wherein X is the number of laterally spaced servo read elements of a magnetic tape drive configured to read and/or write to magnetic tape 320. Equation 1 may be simplified as follows:

$$0.9\frac{B}{X} \le D \le 1.1\frac{B}{X}. \quad \text{(Equation 2)}$$

In one embodiment, tape 320 is to be utilized in a magnetic tape drive having two laterally spaced apart servo read elements 325, 326. In this embodiment the first transition stripe of each burst of each odd servo band is longitudinally shifted from the first transition stripe of each burst of each even servo band by a substantially equal distance "D", wherein D is between 0.45B and 0.55B. In a further embodiment the distance "D" is approximately 0.50B. Therefore, in the embodiment in which two servo read elements read two different servo bands (e.g. 327a and 327b) the head assembly 324 will output servo information for the even servo band 327a at a different time than that of any adjacent servo band (e.g. odd servo band 327b). Similarly, servo read element 325 will output servo information for the odd servo band 327b at a different time than that of any adjacent servo bands (e.g. 327a and 327c). Therefore, each burst of transition stripes within the odd servo bands (e.g. 327b and 327d) is longitudinally shifted or is offset from each burst of transition stripes of the even servo bands (e.g. 327a, 327c, and 327e) such that the servo information of said odd servo bands is interleaved with the servo information from the even servo bands. The above described pattern provides a sampling rate that is doubled over the prior art pattern.

For example, in the present embodiment, assuming a tape velocity of 2 m/sec, a distance "A" of 50 μm, and a distance "B" of 100 μm, the servo read elements 325 and 326, would output servo information at a rate of 40,000 samples every second because the odd servo band pattern is shifted longitudinally shifted from the even servo pattern by a distance of "D", wherein 0.45B≦D≦0.55B.

Returning to FIG. 3, the tape is moved longitudinally across the head assembly 324 so that the servo tracks 327a and 327b are moved across the servo read elements 325 and 326, respectively. When such movement occurs, the servo pattern of magnetic flux transitions is detected by the servo read elements 325 and 326 so that it generates two analog servo read element signals, one for each servo read elements 325 and 326. As described above, in the present embodiment the first transition stripe of each burst of each odd servo band (e.g. 327b) is longitudinally shifted from the first transition stripe of each burst of said even servo band (327a) by a substantially equal distance, "D", such that servo information of the odd servo band (327b) is interleaved with said servo information from the even servo band (327a). The analog servo read element signals for each servo read elements 325 and 326 are provided via a servo signal lines 384 and 390 to signal decoders 386 and 392, respectively. Because of the longitudinal shift the servo signals for the even servo band (327a) and odd servo band (327b) are generated at different times and the respective signal decoders process the servo read element signals separately and generate a position signal that is transmitted via position signal lines 388 and 394 to servo controller 380. The servo controller 380 generates a servo control signal for each servo band (e.g. 327*a* and 327*b*) and provides it on control line(s) 382 to a servo positioning mechanism at head assembly 324. The servo positioning mechanism responds to the control signal from the servo controller 380 by moving the assembly including servo read elements 325 and 326 laterally with respect to the servo track centerline 350 for each servo band respectively (e.g. 327*a* and 327*b*) to reach the desired servo track or to maintain the servo read elements 325 and 326 center with respect to the servo track centerline 350.

Servo detection logic of servo controller 380 is configured to detect from the signals supplied on line(s) 382, the relative timings of the laterally extending transitions, specifically including the transitions having different slants, sensed by the plurality of laterally spaced servo read elements 325 and 326 as the magnetic tape 320 is moved in the longitudinal direction. The servo detection logic is configured to determine from the relative timings of the sensed transitions the "A" distances and information regarding the relationship between the plurality of servo read elements 325 and 326 and the magnetic tape for at least one known set of laterally extending transitions having differing slants.

Figure 5:
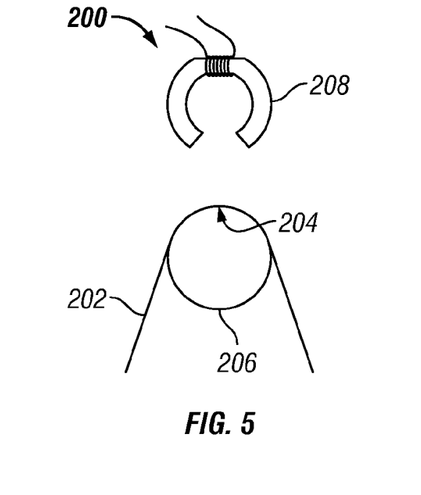
FIG. 5 is a schematic representation of an embodiment of a servo writer in accordance with the present disclosure, which magnetically imprints the magnetic transitions of a plurality of separate servo bands on magnetic tape media.

FIG. 5 illustrates an embodiment of a magnetic imprinting servo writer 200 in accordance with the present embodiment, which magnetically imprints the transitions stripes of a plurality of separate servo bands 327 on magnetic tape 202 to provide differentiating characteristics with respect to the separate servo bands. A magnetic tape 202 onto which the servo patterns are to be recorded is wound around a curved portion of the circumference 204 of a drum 206 in the desired servo pattern. As is understood by those of skill in the art, the drum 206 shields the magnetic tape with which the raised bands have contact, while the external electromagnet 208 projects a magnetic field onto the tape, leaving the desired servo pattern of transition strips imprinted on the magnetic tape. U.S. Pat. No. 5,689,384 discusses the technique in further detail.

In accordance with the present embodiment, the sequence of raised bands provided on the circumference 204 of the drum 206 comprises at least one of the patterns of FIGS. 3 and 4, wherein the transition stripes of all of the odd servo bands (e.g. 327*b*, 327*d*) are longitudinally shifted a substantially equal distance "D" from all of the transition stripes of the even servo bands (e.g. 327*a*, 327*c*, and 327*e*). The tape 202 is moved longitudinally by a drive or by the drum 206 relative to the servo writer 200, and the servo writer 200 is positioned to write two or more of the separate servo bands on the tape 202, the separate servo bands positioned in sequence laterally across the tape 202. The servo writer 200 is operated to energize electromagnet 208 to write the separate servo bands on the tape 202.

A result of the servo writer 200 of FIG. 5 is that the drum 206 continually rotates such that the patterns of the servo bands are continually repeated on the magnetic tape 202. Thus, the magnetic tape 202 need not be moved longitudinally significant distances to determine the servo band that is being sensed.

Figure 6:
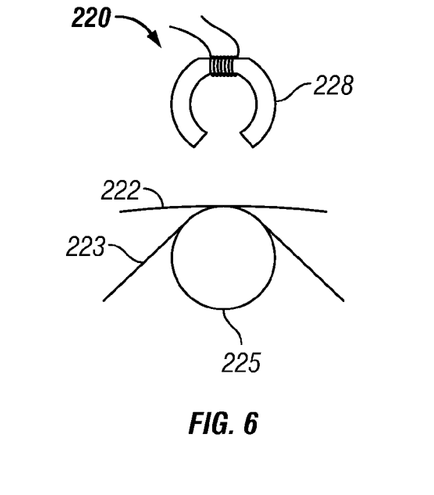
FIG. 6 is a schematic representation of an alternative embodiment of a servo writer in accordance with the present disclosure, which magnetically imprints the magnetic transitions of a plurality of separate servo bands on magnetic tape media.

Another embodiment of a magnetic imprinting servo writer 220 is illustrated in FIG. 6 in accordance with the present embodiment, which magnetically imprints the transitions stripes of a plurality of separate servo bands on a magnetic tape media to provide differentiating characteristics with respect to the separate servo bands. The servo writer 220 and methods are similar to the methods employed in the video tape industry to transfer video information from a master tape to a slave magnetic tape. As is known to those of skill in the art, the prerecorded master tape 222 has a coercivity different than that of a slave tape 223, such that, as the tapes are in contact on the surface of a drum 225 in the presence of an electromagnet 228, the magnetic pattern of the master tape 222 is imprinted on the slave tape 223.

In accordance with the present embodiment, at least one of the servo band patterns of the master tape 222 comprises a pattern illustrated in FIGS. 3 and 4, wherein the transition stripes of all of the odd servo bands (e.g. 327*b*, 327*d*) are longitudinally shifted a substantially equal distance "D" from the transition stripes of all of the even servo bands (e.g. 327*a*, 327*c*, and 327*e*). The tape 223 is moved longitudinally relative to the servo writer 220 by a drive or the drum 225, and the servo writer 220 is positioned to write two or more of the separate servo bands on the tape, the separate servo bands are positioned in sequence laterally across the tape. The servo writer 220 is operated to energize electromagnet 208 as master tape 222 is moved longitudinally in contact with and at the same rate as the tape 223 to write the separate servo bands on the tape 223.

The master tape 222 of FIG. 6 may be the same length as the slave tape 223, such that the patterns of the servo bands may or may not repeat. Thus, the patterns of the servo bands may or may not be continually repeated on the magnetic tape 223. If not repeated, the magnetic tape will need to be moved longitudinally to the differentiating characteristic portion of the tape determine the servo band that is being sensed.

Figure 7:
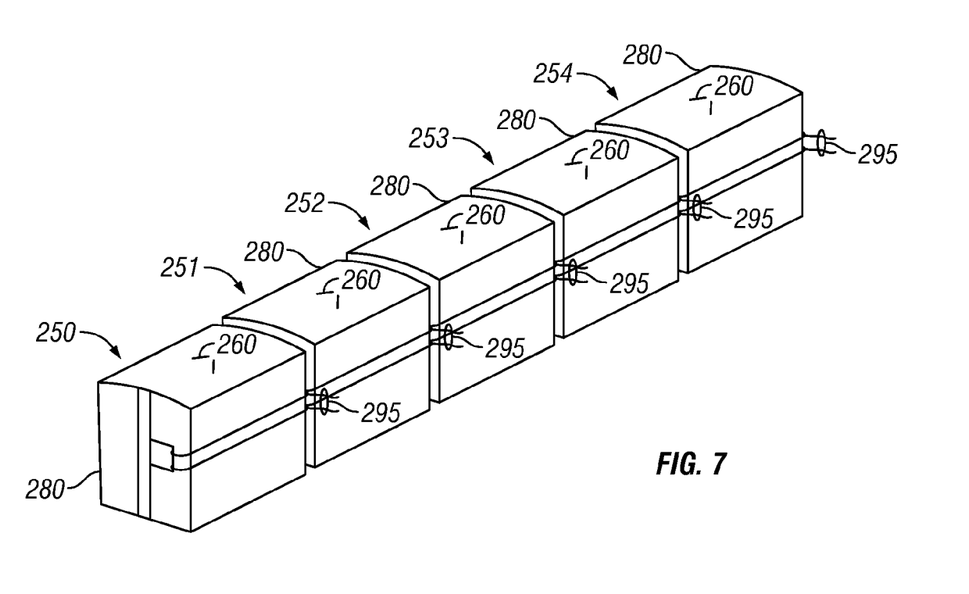
FIG. 7 is an isometric representation of an embodiment of a plurality of servo write heads for magnetically writing the magnetic transitions of a plurality of separate servo bands on magnetic tape media.
Figure 8:
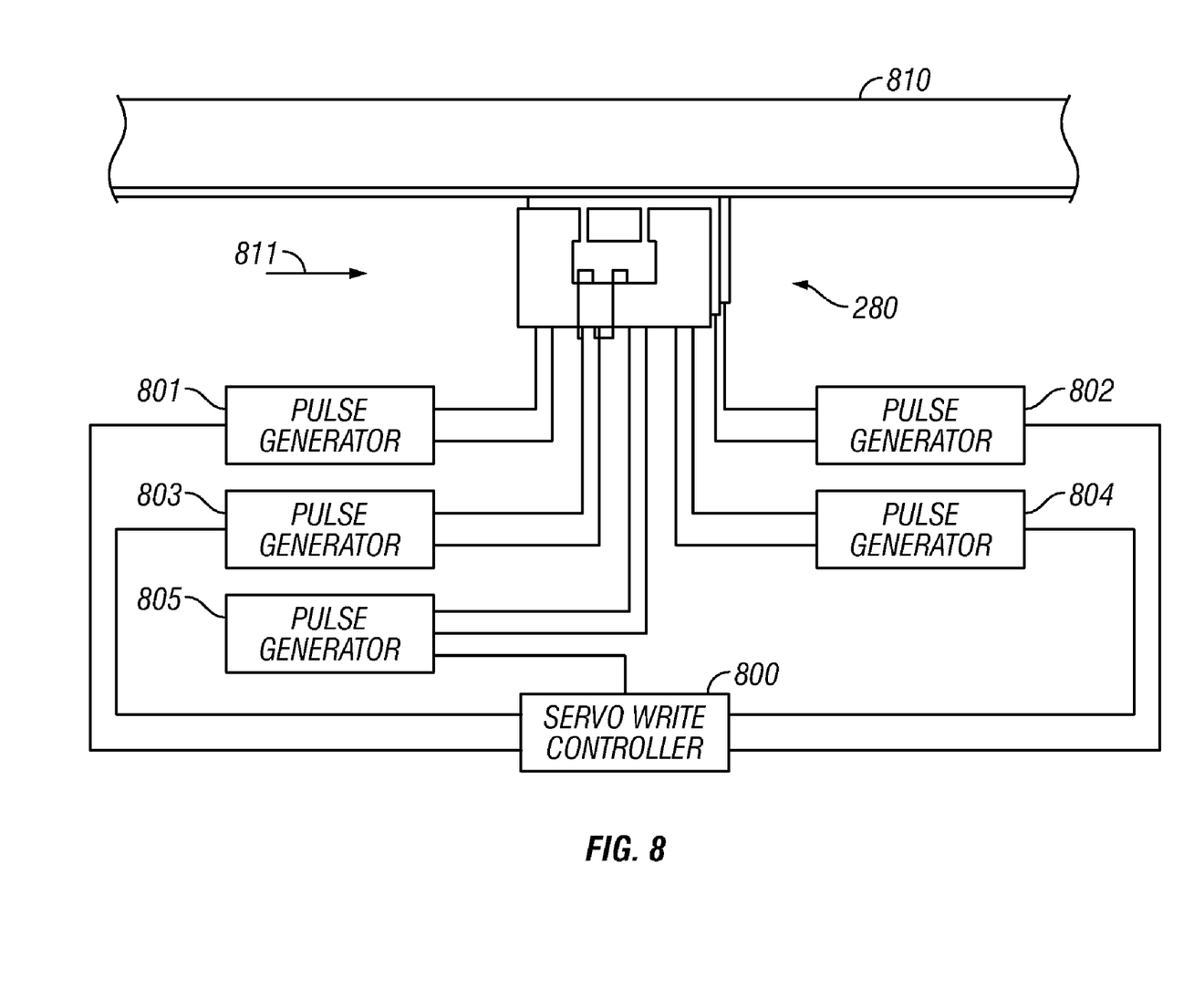
FIG. 8 is a schematic and block representation of a servo writing apparatus in accordance with the present embodiment for magnetically writing the magnetic transitions of a plurality of separate servo bands on a magnetic tape media.

FIGS. 7 and 8 illustrate an embodiment of servo writing apparatus in accordance with the present embodiment, for magnetically writing the laterally extending transition stripes of a plurality of separate servo bands 327 on a magnetic tape media. The servo writer, as described in FIG. 5 or FIG. 6, comprises a plurality of servo write heads 250, 251, 252, 253 and 254. Each of the servo write heads may also comprise separate write heads, or may comprise a single multi-gap write head 280 with a pair of gaps 260, for writing pairs of the non-parallel laterally extending transition stripes.

In one embodiment, the drive (not shown) moves the tape longitudinally, and the separate servo write heads 250, 251, 252, 253 and 254 of write head 280 are employed with separate coils 295 to pulse the gaps 260 with varied timings to record the transitions of the separate servo bands such that all of the transition stripes of the odd servo bands (e.g. 327*b*, 327*d*) are longitudinally shifted a substantially equal distance "D" from all of the transition stripes of the even servo bands (e.g. 327*a*, 327*c*, and 327*e*). An example of construction of servo write heads is provided in the incorporated U.S. Pat. No. 5,689,384. For example, in this embodiment, servo write heads 254, 252, and 250 are pulsed simultaneously to create a portion of the servo pattern (e.g. L1 and L2) of even servo bands 327*a*, 327*c*, and 327*e*. Servo write heads 253 and 251 are then pulsed simultaneously to create a portion of the servo pattern (e.g. M1 and M2) of odd servo bands 327*b* and 327*d* at a time after write heads 254, 252, and 250 are pulsed such that the time delay shifts all of the transition stripes of the odd servo bands (e.g. 327*b*, 327*d*) longitudinally a substantially equal distance "D" from all of the transition stripes of the even servo bands (e.g. 327*a*, 327*c*, and 327*e*). As described above distance "D" is defined by Equation 2. In one embodiment distance "D" is between 0.45B and 0.55B. In a further embodiment the distance "D" is approximately 0.50B.

Referring to FIG. 8, as a drive (not shown) moves a magnetic tape media 810 longitudinally in the direction of arrow 811, the servo writer is operated in accordance with the present embodiment by a servo write controller 800 which operates pulse generators 801, 802, 803, 804, and 805 to magnetically pulse coils 295 of separate servo write heads 250, 251, 252, 253, 254 to record the laterally extending transitions of the plurality of separate servo bands 327 on the magnetic tape media 810 in accordance with methods of the present embodiment such that the transition stripes of all of the odd servo bands (e.g. 327b, 327d) are longitudinally shifted a substantially equal distance "D" from all of the transition stripes of the even servo bands (e.g. 327a, 327c, and 327e).

For example, the servo write controller 800 may operate pulse generators 803, 804, and 805 to magnetically pulse coils 295 corresponding to servo write heads 250, 252, and 254 that record the even laterally extending transitions (327b and 327d). After a time delay, the servo write controller 800 may operate pulse generators 801, 802 to magnetically pulse coils 295 corresponding to servo write heads 251 and 253 that record the odd laterally extending transitions (327b and 327d), such that the transition stripes of all of the odd servo bands (e.g. 327b, 327d) are longitudinally shifted a substantially equal distance "D" from all of the transition stripes of the even servo bands (e.g. 327a, 327c, and 327e). In accordance with the present invention, the timing of the pulses of pulse generators 801, 802, 803, 804, and 805 are operated by servo write controller 800 wherein the servo write controller 800 magnetically pulses coils 295 of servo write heads 250, 251, 252, 253, 254 of write head 280 to create the longitudinal shift, so as to form the pattern described in FIGS. 3 and 4.

Figure 9A:
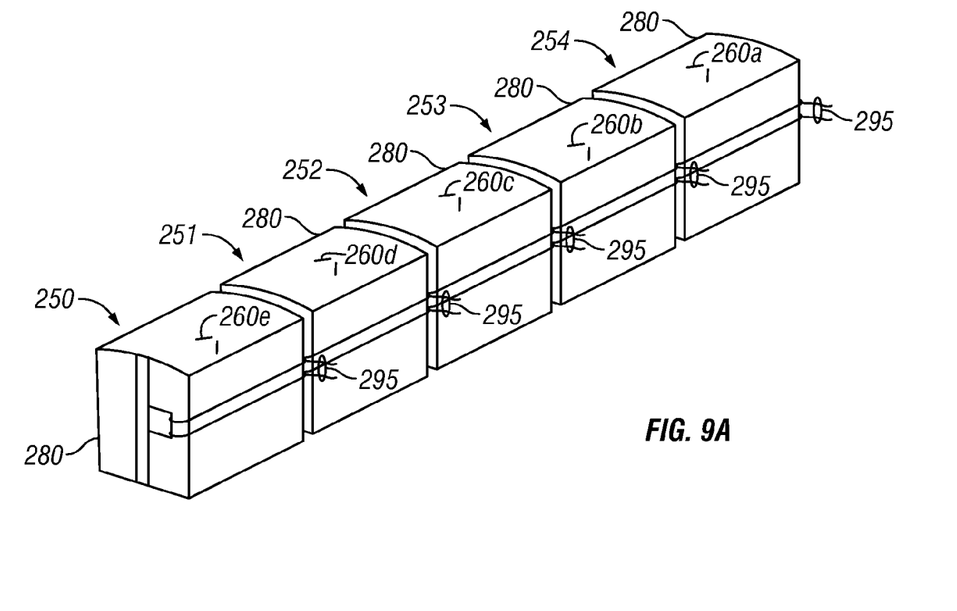
FIG. 9A is an isometric representation of an alternative embodiment of a plurality of servo write heads for magnetically writing the magnetic transitions of a plurality of separate servo bands on magnetic tape media.
Figure 9B:
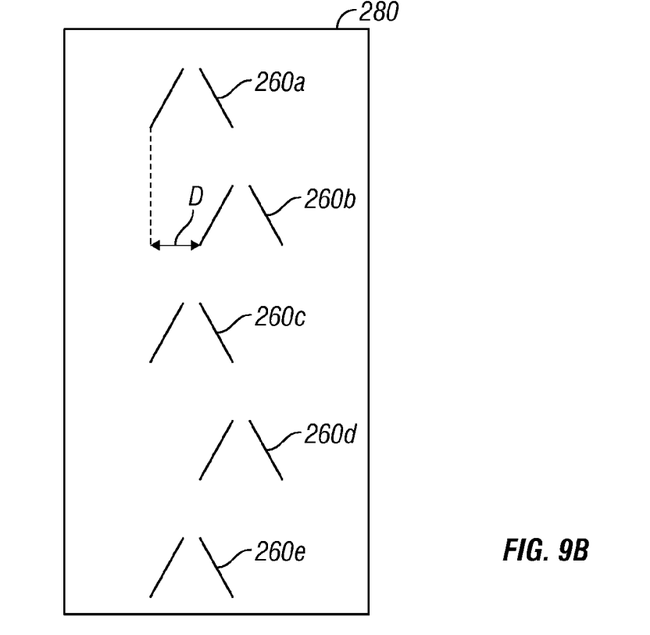
FIG. 9B is a top down view of an alternative embodiment described in FIG. 9A for magnetically writing the magnetic transitions of a plurality of separate servo bands on magnetic tape media.

FIGS. 9A and 9B, illustrate another embodiment in which the actual servo write head 280 is constructed such that the pattern on servo write heads 250, 252, and 254 utilized to create the even servo bands (e.g. 327a, 327c, and 327e) are longitudinally shifted a substantially equal distance "D" from the pattern on servo write heads 251 and 253 utilized to create the odd servo bands (e.g. 327b, 327d).

FIG. 9B shows a top down view of servo write head 280 utilized in the present embodiment. It can be seen that the pair of gaps 260 (e.g. 260a, 260c, and 260e) utilized to create the even servo bands (e.g. 327a, 327c, and 327e) are longitudinally shifted a substantially equal distance "D" from the pair of gaps 260 (e.g. 260b and 260d) utilized to create the odd servo bands (e.g. 327b, 327d).

In present embodiment in which servo write head 280 is constructed such that each of the patterns responsible for the creating the even servo bands is longitudinally shifted from each of the patterns responsible for creating the odd servo bands by a substantially equal distance "D" it should be understood that all of the servo write heads 280 (e.g. 250, 251, 252, 253 and 254) are pulsed simultaneously.

Further, it should be understood by one of ordinary skill in the art that while FIG. 9A shows separate servo write heads 250, 251, 252, 253 and 254, a single write head 280 may be utilized in which each of the patterns responsible for the creating the even servo bands is longitudinally shifted from each of the patterns responsible for creating the odd servo bands by a substantially equal distance "D".

Again, referring to FIG. 8, as a drive (not shown) moves a magnetic tape media 810 longitudinally in the direction of arrow 811, the servo writer is operated in accordance with the present embodiment by a servo write controller 800 which operates pulse generators 801, 802, 803, 804, and 805 to magnetically pulse coils 295 of the write heads 280, e.g. of separate servo write heads 250, 251, 252, 253, 254 to record the laterally extending transitions of the plurality of separate servo bands on the magnetic tape media 810 in accordance with methods of the present embodiment to provide the transition stripes of all of the odd servo bands (e.g. 327b, 327d) longitudinally shifted a substantially equal distance "D" from all of the transition stripes of the even servo bands (e.g. 327a, 327c, and 327e). In accordance with the present invention, the timing of the pulses of pulse generators 801, 802, 803, 804, and 805 are operated by servo write controller 800 which magnetically pulses coils 295 of the write heads 280 simultaneously to create the longitudinal shift, so as to form the pattern of FIGS. 3 and 4.

In another embodiment, only a single pulse generator (e.g. 801) is required when all of the servo write heads 250, 251, 252, 253, 254 are to be pulsed simultaneously. In yet another embodiment, a single write head 280 is configured to contain each of the patterns longitudinally shifted as described above. In this described embodiment only a single pulse generator (e.g. 801) is required to create the pattern as described in FIGS. 3 and 4.

While the above described embodiment discusses a head assembly comprising two servo read elements, a head assembly may comprise any number of servo elements. For example, in another embodiment, the head assembly 324 comprises three servo read elements. Accordingly, each burst of transition stripes within one servo band is shifted or is offset a substantially equal distance "D" from the burst of transition stripes of the previous servo band. In one embodiment, in which three servo read elements are utilized the distance "D" is between 0.30B and 0.37B as described by Equation 2. In a further embodiment, the distance "D" is approximately 0.33B.

For example, each burst of transition stripes of servo band 327b will be shifted longitudinally a distance "D" of approximately 0.33B from each burst of transition stripes of servo band 327a. Similarly, each burst of transition stripes of servo band 327c will be shifted longitudinally a distance "D" of approximately 0.33B from each burst of transition stripes of servo band 327b. Further, each burst of transition stripes of servo band 327d will be shifted longitudinally a distance "D" of approximately 0.33B from each burst of transition stripes of servo band 327c such that the transition stripes of servo band 327d is aligned with the transition stripes of servo band 327a. Finally, each burst of transition stripes of servo band 327e will be shifted longitudinally a distance "D" approximately 0.33B from each burst of transition stripes of servo band 327d such that the transition stripes of servo band 327e are aligned with the transition stripes of servo band 327b.

Similar to that discussed above with respect to FIGS. 3 and 4, since the transition stripes are longitudinally shifted from each other by a distance "D", each of the servo read elements output servo information regarding distances "A" and "B" at a different time than any adjacent servo band. For example, in the embodiment in which three servo read elements read three different servo bands (e.g. 327a, 327b, and 327c) the head assembly 324 (with three servo heads, not shown) will output servo information for servo band 327b at a different time than that any adjacent servo band (e.g. 327a and 327c) such that the servo information of said odd servo bands is interleaved with the servo information from the even servo bands, and specifically, that the servo information of a servo band is interleaved with the servo information from any adjacent servo band. The above described pattern provides a sampling rate that is tripled over the prior art pattern.

For example, in the present embodiment, assuming a tape velocity of 2 m/sec, a distance "A" of 50 µm, and a distance "B" of 100 µm, the servo read elements 325 and 326, would output servo information at a rate of 60,000 samples every second since each burst of transition stripes within one servo band is shifted or is offset a substantially equal distance "D" from the burst of transition stripes of the previous servo band, wherein 0.30B≦D≦0.37B.

It should be understood by one of ordinary skill in the art that while the above description describes magnetic transition stripes recorded on magnetic tape, it should be understood that the servo bands 327 may comprise any of several types of longitudinal servo patterns as is known to those of skill in the art.

While the present embodiment describes servo bands 327a, 327c, and 327e as even servo bands and 327b, and 327d as odd servo bands, it should be understood by one of ordinary skill in the art that 327a, 327c, and 327e may be defined as odd servo bands and 327b, and 327d may be defined as even servo bands. Rather, it is only important that each burst of transition stripes within one servo band is longitudinally shifted or is offset from each burst of transition stripes of any adjacent servo band by a substantially equal distance, "D".

Further, while the present disclosure describes a magnetic tape 320 having five servo bands and four data bands, the present disclosure may be practiced on any magnetic tape having a plurality of servo bands.

The logic discussed above may comprise any suitable logic arrangement known to those of skill in the art. Further, those of skill in the art will understand that differing specific component arrangements may be employed than those illustrated herein.

While particular embodiments of the present invention have been shown and described, it will be obvious to those skilled in the art that, based upon the teachings herein changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method for writing a plurality of servo bands on a magnetic tape comprising:
   moving said magnetic tape longitudinally relative to at least one servo write head, said at least one servo write head positioned to write a plurality of parallel longitudinal servo bands, wherein said plurality of servo bands comprise odd servo bands and even servo bands, each of said odd servo bands lie between said each of said even servo bands;
   operating said at least one servo write head to write said plurality of parallel longitudinal servo bands on said magnetic tape such that each of said plurality of servo bands comprise a plurality of frames, wherein each frame comprises a plurality of bursts of transition stripes, each burst having a first transition stripe;
   said first transition stripe of each burst of each said odd servo band is longitudinally shifted from said first transition stripe of each burst of each said even servo band by a substantially equal distance, D, such that servo information of said odd servo bands is interleaved with servo information from said even servo bands.

2. The method of claim 1, wherein operating said at least one servo write head to write said plurality of parallel longitudinal servo bands on said magnetic tape such that each frame of said plurality of frames further comprises a first burst of transition stripes in a first azimuthal orientation and a second burst of transition stripes in a second azimuthal orientation different than said first azimuthal orientation, followed by a third burst of transition stripes in said first azimuthal orientation and a fourth burst of transition stripes in said second azimuthal orientation and wherein a distance between said first transition stripe of said first burst and said first transition stripe of said third burst is a distance B.

3. The method of claim 2, wherein 0.45B≦D≦0.55B.

4. The method of claim 3, wherein D is approximately 0.50B.

5. The method of claim 2, wherein 0.30B≦D≦0.37B.

6. The method of claim 3, wherein D is approximately 0.33B.

7. The method of claim 1, wherein said magnetic tape is configured for a tape drive having a plurality of servo read elements, said first transition stripe of each burst of each said odd servo band is longitudinally shifted from said first transition stripe of each burst of each said even servo band by said substantially equal distance, D, wherein $$0.9 \frac{B}{X} \le D \le 1.1 \frac{B}{X}$$

and wherein X is a number servo read elements.

8. The method of claim 7, wherein said magnetic tape is configured for said tape drive having two servo read elements such that 0.45B≦D≦0.55B.

9. The method of claim 7, wherein said magnetic tape is configured for said tape drive having three servo read elements such that 0.30B≦D≦0.37B.

10. A system for writing a plurality of servo bands on a magnetic tape comprising:
    a drive for moving said magnetic tape longitudinally relative to at least one servo write head;
    said at least one servo write head positioned to write a plurality of parallel longitudinal servo bands, wherein said plurality of servo bands comprise odd servo bands and even servo bands, each of said odd servo bands lie between said each of said even servo bands;
    said at least one servo write head configured to write said plurality of parallel longitudinal servo bands on said magnetic tape such that each servo band comprises a plurality of frames, wherein each frame comprises a plurality of bursts of transition stripes, each burst having a first transition stripe;
    said first transition stripe of each burst of each said odd servo band is longitudinally shifted from said first transition stripe of each burst of each said even servo band by a substantially equal distance, D, such that servo information of said odd servo bands is interleaved with servo information from said even servo bands.

11. The system of claim 10, wherein said at least one servo write head is configured to write said plurality of parallel longitudinal servo bands on said magnetic tape such that each frame of said plurality of frames further comprises a first burst of transition stripes in a first azimuthal orientation and a second burst of transition stripes in a second azimuthal orientation different than said first azimuthal orientation, followed by a third burst of transition stripes in said first azimuthal orientation and a fourth burst of transition stripes in said second azimuthal orientation and wherein a distance between said first transition stripe of said first burst and said first transition stripe of said third burst is a distance B.

12. The system of claim 11, wherein 0.45B≦D≦0.55B.

13. The system of claim 11, wherein 0.30B≦D≦0.37B.

14. The system of claim 10, wherein said at least one servo write head is configured to write said plurality of parallel longitudinal servo bands such that said first transition stripe of each burst of each said odd servo band is longitudinally shifted from said first transition stripe of each burst of each said even servo band by said substantially equal distance, D, wherein $$0.9\frac{B}{X} \leq D \leq 1.1\frac{B}{X}$$

and wherein X is a number servo read elements.

15. The system of claim 14, wherein said at least one servo write head is configured to write said plurality of parallel longitudinal servo bands on said magnetic tape configured for a tape drive having two servo read elements such that $0.45B \leq D \leq 0.55B$.

16. The system of claim 14, wherein said at least one servo write head is configured to write said plurality of parallel longitudinal servo bands on said magnetic tape configured for a tape drive having three servo read elements such that $0.30B \leq D \leq 0.37B$.

17. A system for writing a plurality of servo bands on a magnetic tape comprising:
at least three spaced apart servo write heads, wherein said at least three spaced apart servo write heads comprise odd servo write heads and even servo write heads, each of said odd servo write heads lie between said each of said even servo write heads;
a drive for moving said magnetic tape longitudinally relative to said at least three spaced apart servo write heads;
a source of timed pulses coupled to said even servo write heads configured to write even servo bands, wherein said even servo band comprises a plurality of frames, wherein each frame comprises a plurality of bursts of transition stripes, each burst having a first transition stripe;
a source of timed pulses coupled to said odd servo write heads configured to write odd servo bands, wherein each odd servo band comprises a plurality of frames, wherein each frame comprises a plurality of bursts of transition stripes, each burst having a first transition stripe; and wherein each of said odd servo bands lie between said each of said even servo bands;
wherein said source of timed pulses coupled to said odd servo write heads are timed such that said first transition stripe of each burst of each said odd servo band is longitudinally shifted from said first transition stripe of each burst of each said even servo band by a substantially equal distance, D, such that servo information of said odd servo bands is interleaved with servo information from said even servo bands.

18. The system of claim 17, wherein said at least three spaced apart servo write heads are configured to write said plurality of parallel longitudinal servo bands on said magnetic tape such that each frame of said plurality of frames further comprises a first burst of transition stripes in a first azimuthal orientation and a second burst of transition stripes in a second azimuthal orientation different than said first azimuthal orientation, followed by a third burst of transition stripes in said first azimuthal orientation and a fourth burst of transition stripes in said second azimuthal orientation and wherein a distance between said first transition stripe of said first burst and said first transition stripe of said third burst is a distance B.

19. The system of claim 18, wherein $0.45B \leq D \leq 0.55B$.

20. The system of claim 18, wherein $0.30B \leq D \leq 0.37B$.

21. The system of claim 17, wherein said at least three spaced apart servo write heads are configured to write said plurality of parallel longitudinal servo bands such that said first transition stripe of each burst of each said odd servo band is longitudinally shifted from said first transition stripe of each burst of each said even servo band by said substantially equal distance, D, wherein $$0.9\frac{B}{X} \leq D \leq 1.1\frac{B}{X}$$

and wherein X is a number servo read elements.

22. The system of claim 21, wherein said at least three spaced apart servo write heads are configured to write said plurality of parallel longitudinal servo bands on said magnetic tape configured for a tape drive having two servo read elements such that $0.45B \leq D \leq 0.55B$.

23. The system of claim 21, wherein said at least three spaced apart servo write heads are configured to write said plurality of parallel longitudinal servo bands on said magnetic tape configured for a tape drive having three servo read elements such that $0.30B \leq D \leq 0.37B$.

* * * * *